Jan. 19, 1932.     H. C. FORD     1,842,160
SPEED AND DISTANCE INDICATOR
Filed May 8, 1926
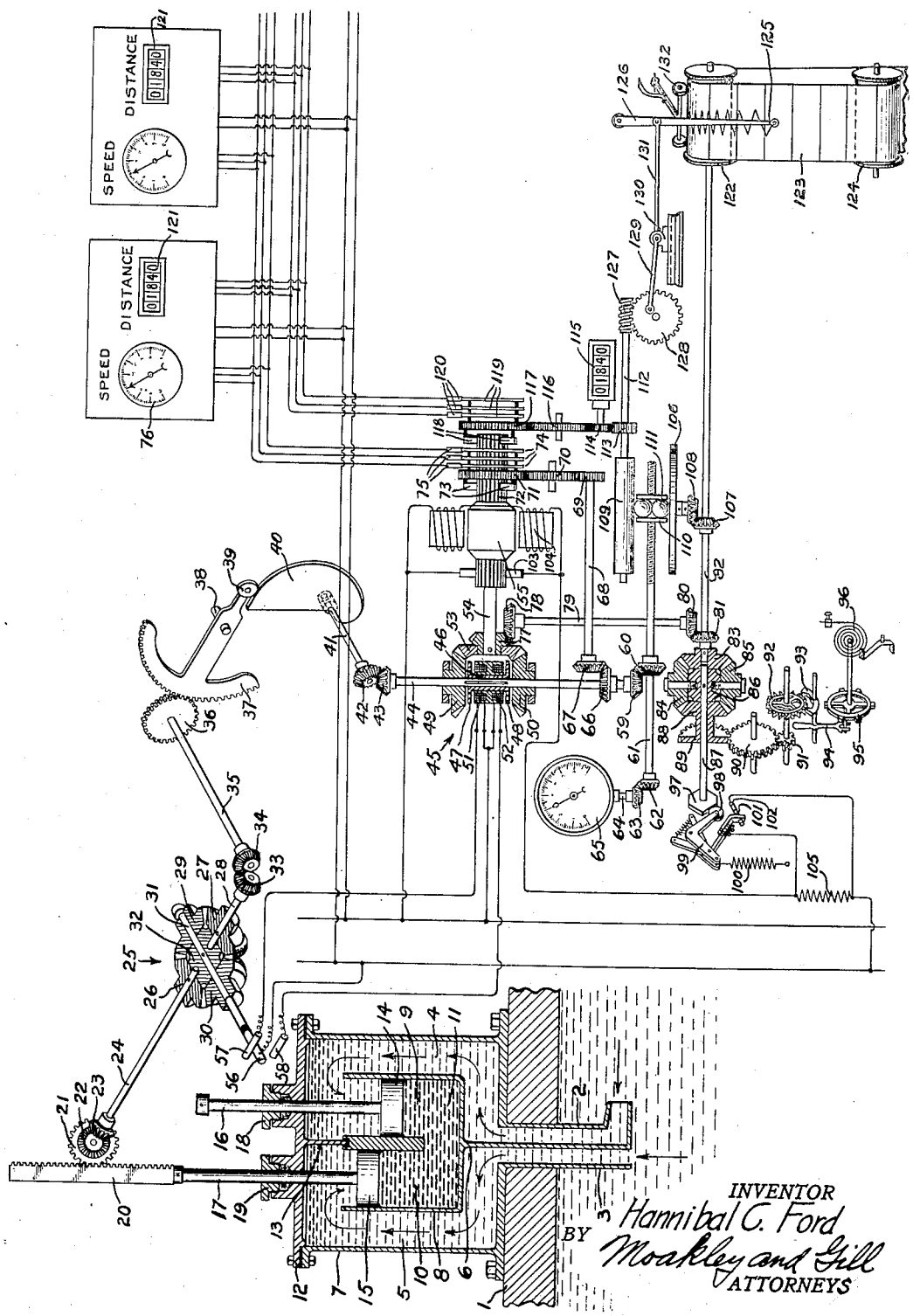
INVENTOR
Hannibal C. Ford
BY Moakley and Gill
ATTORNEYS Patented Jan. 19, 1932

1,842,160

UNITED STATES PATENT OFFICE

HANNIBAL C. FORD, OF JAMAICA, NEW YORK, ASSIGNOR TO FORD INSTRUMENT COMPANY, INC., OF LONG ISLAND CITY, NEW YORK, A CORPORATION OF NEW YORK

SPEED AND DISTANCE INDICATOR

Application filed May 8, 1926. Serial No. 107,684.

This invention relates to indicating devices and more particularly to devices for indicating the speeds of and distances travelled by marine vessels.

Heretofore, the speeds of vessels have commonly been indicated by engine or propeller shaft speedometers, whereby the theoretical speeds of the vessels have been indicated, all other things being considered to be equal. Accordingly, no compensations have been directly made for errors due to tides, currents, drift, wind and the like, whereby the actual speed of a vessel is materially increased or decreased over the theoretical speed indicated which is, therefore, inaccurate. More acurate speed indicating devices such as flow meters and the like have been developed but they are not sufficiently sensitive to be wholly accurate and are therefore not dependable for directly indicating actual vessel speeds and distances, and require auxiliary apparatus and correction and compensating means before the true readings are obtainable.

The principal object of this invention is to provide a speed and distance indicating device which is simple and efficient in operation, accurate and sensitive, and adapted to directly indicate instantaneous actual speeds and distances at remote points, and to record the same and the time thereof without additional apparatus or the necessity of making compensating calculations.

Another object is to provide a complete self-contained and integrally operative automatic speed and distance meter or ship's log, with the aid of which the vessel may be readily controlled and maintained at the desired speed without regard to external conditions or the necessity of making additional calculations or observations.

The above objects are obtained by the provision of a hydraulic differential or a hydraulic pressure receiver whereby the pressure difference between the static and dynamic fluid head is utilized for indirectly effecting the actuation of a rectifying or converting system in accordance with the substantially geometric ratio established by the relation between the fluid pressure of flow and the square of the velocity of flow. By automatically subtracting the static pressure from the pressure due to both static and dynamic heads, the true pressure developed by the travel of the vessel is the result. The variable motion produced by the differential fluid pressure is automatically rectified to a definite uniform rate of motion, which represents the speed of the vessel, and which rate is automatically integrated with respect to time to produce the distance travelled during any period of time. The speed and distance travelled are preferably transmitted to indicating receivers at various remote points in the vessel for the purpose of designating data for navigation, gunnery, and the like. The sensitivity of the hydraulic differential is maintained by utilizing the resultant fluid pressure only for effecting the control of a separate device which is utilized for driving the rectifying, integrating, recording, and signalling means, whereby simplicity and economy of operation is obtained as well as a self-contained operating unit.

The particular nature of the invention together with other objects and advantages thereof will appear more clearly from a description of the apparatus shown in the accompanying drawing, in which the figure is a schematic view of the apparatus, partly in elevation and partly in perspective and with certain parts in section. Numeral 1 designates the hull of a vessel, which is provided with an opening below the low water line and preferably adjacent the keel. Two tubes, preferably of equal interior cross-sectional area, protrude through the opening into the water, one of the tubes 2, being a Pitot tube and disposed so that the plane of its orifice is normal to the direction of fluid flow, i. e., normally facing the bow of the vessel and parallel to the vessel's keel. The other tube 3, is straight and vertically disposed parallel to the Pitot tube 2, but behind the latter with reference to the fore-and-aft line of the vessel.

Tubes 2 and 3 open into respective pressure chambers 4 and 5 which are formed by a partition 6 in a casing 7 preferably attached to the inside surface of the vessel's hull 1. Mounted in the casing 7 and on the partition 6 is a container 8 which is provided with a pair of cylinders 9 and 10 which communicate at their tops with the pressure chambers 4 and 5, respectively, the cylinders 9 and 10 being connected in their bottom portions by an opening 11. The lid 12 of casing 7 is provided with an integral transverse web 13 which cooperates with container 8 and partition 6 to completely separate pressure chambers 4 and 5. A pair of pistons 14 and 15 are inserted into cylinders 9 and 10, respectively, container 8 being preferably filled with mercury so that pistons 14 and 15 float thereon and move in accordance with the differential fluid pressure in chambers 4 and 5, piston 14 being the driving member since it is actuated by the dynamic fluid pressure due to the motion of the Pitot tube 2 through the water. The rods 16 and 17 of pistons 14 and 15, respectively, pass through stuffing boxes 18 and 19 respectively, provided therefor in lid 12. The resulting device, which includes the pressure chambers 4 and 5, the tube 2 leading to the former and the tube 3 to the latter, together with the intercommunicating cylinders 9 and 10 and their respective pistons 14 and 15, constitutes a hydraulic differential. The rod 16 is merely a guide for piston 14 and terminates outside of its stuffing box 18, whereas rod 17 is provided with a rack 20 which meshes with a gear 21 mounted upon a fixed bearing. An integral concentric bevel pinion 22 rotates with gear 21 as rack 20 moves, which motion is transmitted by bevel gear 23 and shaft 24 to differential or epicyclic gear train 25, comprising gear 26 pinned to shaft 24, opposite gear 27 pinned to a short shaft 28, and opposed gears 29 and 30 freely rotatable upon shaft 31, which is pinned to and passes through the spider 32 of the differential 25, in which are also journalled the ends of shafts 24 and 28. Shaft 28 is aligned with shaft 24 and carries a bevel gear 33 which meshes with another bevel gear 34 attached to shaft 35, upon the other end of which is mounted spur gear 36 which in turn meshes with a toothed sector 37 pivotally mounted upon a stationary pin 38. Sector 37 is provided with a radial arm having a roller 39 which bears upon cam 40, whereby the position of sector 37 and consequently of gear 27 of differential 25 is determined.

The curvature of cam 40 corresponds generally to the relation existing between the speed of the vessel and the resultant effect of the fluid pressures in the hydraulic differential as manifested by the displacement of piston 15. Variations in the displacement of piston 15, in accordance with speed changes, are therefore substantially annulled by cam 40, so that the variable motion is converted or rectified into uniform motion. Cam 40 is rigidly attached to one end of shaft 41, the other end of which carries bevel gear 42 which meshes with and is driven by bevel gear 43 fixed to one end of shaft 44, which passes through electromagnetic clutch 45. Splined to and freely slidable upon shaft 44 is a collar 46 provided with integral discs 47 and 48 at its ends, which are adapted to coact frictionally with flat inner surfaces provided on gears 49 and 50 respectively, according to which one of the stationary electromagnetic coils 52 or 51, respectively, is energized. For example, if magnet coil 51 is energized, it will draw disc 47 to it to slide sleeve 46 upon its spline axially along shaft 44 to effect the frictional engagement of disc 48 with the coacting flat surface of gear 50, whereby gear 50 is clutched to shaft 44 and drives the same in the direction which the former is being driven by bevel gear 53 attached to shaft 54 of constantly rotating transmitter armature 55.

Any rotation of gear 26 of differential 25 is relative to the position of normally stationary gear 27 of the differential, so that its motion is transmitted to opposed gears 29 and 30 which effect the angular movement of differential spider 32 and of shaft 31, the latter being provided with an insulated contact 56 which is connected to one side of an electrical supply line, and which, when shaft 31 is angularly moved, contacts with either one of stationary coacting contacts 57 or 58, which are respectively connected to coils 51 and 52 of electromagnetic clutch 45, the other terminals of which are connected to the other side of the electrical supply line. Contacts 57 and 58 are preferably made adjustable so that their spacing with respect to each other and to movable contact 56 may be variable at will. Accordingly, any motion of gear 26 effects the motion of contact 56 to engage either one of contacts 57 or 58 and thus close the circuit to energize either coil 51 or coil 52 of electromagnetic clutch 45 to clutch either gear 50 or 49, respectively, to shaft 44. Shaft 44 is accordingly revolved and actuates cam 40 to move sector 37 and consequently gear 36, shaft 35, bevel gears 34 and 33, shaft 28 and gear 27 of differential 25, until gear 27 has been revolved through the same angle that gear 26 had been revolved, whereupon spider 32 is returned to its normal position and contact between 56 and either contact 57 or contact 58, as the case may be, is broken. This causes the de-energization of electromagnetic clutch 45 and the release of shaft 44 which then becomes stationary. The resultant action is a step-by-step follow-up motion whereby shaft 44 receives uniform but intermittent motion when the vessel is accelerating or decelerating, and is obviously stationary if the vessel is maintaining uniform speed or is stationary.

The angular position of shaft 44 represents the speed of the vessel, which may be indicated by a uniformly graduated speedometer of a conventional type such as is connected to shaft 44 by means of bevel gears 59 and 60, shaft 61, bevel gears 62 and 63, and shaft 64, and is designated 65. The pointer of the speedometer is repositioned at every change of speed of the vessel according to which direction shaft 44 is revolved, which repositioning of the pointer may or may not be isochronous, depending upon whether the vessel is uniformly accelerating or decelerating or non-isochronous in the contrary case.

The aforesaid angular position of shaft 44 and the changes in the angular position thereof are transmitted by bevel gears 66 and 67, shaft 68, and spur gears 69, 70 and 71 to the transmission brushes of an electrical transmitter, preferably of the type disclosed in the co-pending application of Harry L. Tanner, entitled Transmission system, Serial Number 724,912, filed July 8, 1924. In this system the signal transmitter comprises a power driven armature 55, having a commutator 72 and brushes 73 contacting therewith, which are mounted upon a movable frame having a gear 71 and slip rings 74 attached thereto, so that when the gear is revolved in accordance with the signal to be transmitted, polyphase variable frequency currents are transmitted through brushes 75 to the receivers 76, which are disposed wherever desired about the vessel. At zero angular velocity of transmitter brushes 73, the frequency is zero, resulting in a uniform direct current, under which condition the armatures of the receivers 76 are stationary, but when the transmitter brushes 73 are shifted, the variable frequency currents which are set up actuate the receiver armatures and the connected indicators accordingly. Thus the instantaneous speed of the vessel may be observed upon dial 65 and likewise upon remote receivers 76.

An automatic speed regulator is provided for the purpose of maintaining the speed of motor armature 55 constant, which is preferably of the type disclosed in my copending application entitled Speed regulating mechanism, Serial Number 558,961, filed May 6, 1922. This mechanism comprises a bevel pinion 77 attached to shaft 54 of armature 55, which thereby drives bevel gear 78, shaft 79, bevel gear 80, and bevel gear 81 pinned to shaft 82, which in turn is pinned to differential bevel gear 83. Opposed differential bevel gears 84 and 85 mesh with gear 83 and rotate freely upon spider 86 to which is pinned a shaft 87 upon which is journalled the other differential bevel gear 88 provided with an integral spur gear 89. Gear 89 through gear 90 and pinion 91 is connected to an escapement wheel 92, pallet 93, fork 94, balance wheel 95, and spiral spring 96. Shaft 87, attached to differential spider 86, carries a hexagonal cam 97 against which a roller 98 mounted at one end of a bell-crank lever 99 is pressed by means of a spring 100 connected to the other end of the lever and to a fixed point. Mounted upon lever 99 is a movable contact 101 which is given a wiping motion whenever it is caused to enagge fixed contact 102 as cam 97 rotates and actuates bell-crank lever 99, which wiping motion keeps the contacting surfaces of contacts 101 and 102 in good condition. The motor, which is shown shunt-wound, is connected to the supply line through its brushes 103 and field poles 104 in the usual manner, and one of the connecting lines to the motor is provided with a resistance 105 which is cut out of the circuit whenever contacts 101 and 102 are closed and cut in the circuit whenever they are opened.

In considering the operation of the speed regulator, let it be assumed that the parts are in the positions illustrated, i. e., with the contacts 101 and 102 in engagement and resistance 105 accordingly cut out of the motor circuit, whereby the motor receives maximum current. Spring 100 will, through bell-crank lever 99, cam 97 and shaft 87, apply a torque to differential spider 86 so that as bevel gear 83 is rotated by the motor, bevel gear 88 will also be rotated to drive the escapement through gears 89, 90 and pinion 91. The mechanism is so designed that when the resistance 105 is short-circuited, the motor will tend to run above the predetermined speed for which it is to be regulated, which is the speed at which it will drive the escapement without any movement of differential spider 86. As soon as the motor begins to exceed its predetermined speed there will be a movement of spider 86, which, through shaft 87, will turn cam 97 to displace bell-crank lever 99 and thus separate contacts 101 and 102, whereby resistance 105 is cut in the circuit and the speed of the motor is automatically reduced, since its current supply is diminished. The resistance 105 is of such magnitude as to cause the motor to slow down below its predetermined speed, whereupon differential spider reverses its former movement and contacts 101 and 102 are reclosed. Accordingly the regulator acts in a hunting manner whereby the speed of the motor is maintained substantially constant.

The regulated speed of shaft 82 is utilized to drive integrator disc 106 through bevel gears 107 and 108 at a constant speed. Inasmuch as the distance travelled is a function of speed and time, the proportional speed of the vessel, as developed by shaft 61, is mechanically integrated with respect to time, which is represented by the isochronous rotation of shaft 82. The integrator utilized is preferably of the type disclosed in my Patent Number 1,317,915, of October 7, 1919, entitled Mechanical movement. The integrator comprises driving disc 106 and a roller 109, between which is interposed a frame 110 provided with a nut by which the frame is caused to move axially upon the screw provided upon shaft 61 as the latter is rotated by increments or decrements in the speed of the vessel. A pair of balls 111 are disposed in frame 110 so as to contact with each other, one of them contacting with disc 106, whereas the other contacts with roller 109. Accordingly, as disc 106 rotates, the rotation is transmitted to roller 109 by balls 111, and the variable position of frame 110 with respect to the center of disc 106 varies the speed of rotation of roller 109, in accordance with the surface speed of disc 106 at the particular point where the balls 111 are disposed thereon. Accordingly, the speed of rotation of roller 109 is varied as the speed varies, inasmuch as such variation in speed alters the position of the balls 111 upon driving disc 106. The number of revolutions of roller 109 is proportional to the distance traversed by the vessel, which revolutions are transmitted by shaft 112 and spur gears 113 and 114 to an odometer 115, which is calibrated to register the actual number of miles travelled. Obviously when the vessel is travelling at constant speed, roller 109 rotates at constant speed, and when the vessel is stationary, the balls 111 are disposed at the center of disc 106 and transmit no power to roller 109 inasmuch as screw shaft 61 is adjusted so that ball frame 110 is brought to central position at such a time.

The distance travelled is transmitted to remote parts of the vessel in the same manner and preferably to the same places that the speed is transmitted. Odometer gear 114 drives gears 116 and 117, the latter being attached to a movable frame having brushes 118 contacting with commutator 72, and mounting slip rings 119 against which bear the brushes 120, whereby the signal indications are transmitted to remote odometers or distance registers 121.

A permanent speed and distance graphic recording apparatus is also provided and consists of a friction roller 122 which is driven at constant speed by speed regulated shaft 82, and which steadily draws a strip of paper or other flexible record material 123 from a supply roll 124 and delivers it to a spool or other receiving means not shown. Record strip 123 is divided into equal spaces, each of which represents a definite unit of time as it passes beneath a relatively fixed point or stylus 125 which is attached to one end of a lever 126, the other end of which is pivoted at a fixed point. As shaft 112 of roller 109 rotates, its rotation is transmitted by worm 127 integral therewith to worm wheel 128, which eccentrically mounts a connecting rod 129 so that the rotation of worm wheel 128 oscillates lever 126 through cross-head 130 and rod 131. Inasmuch as the speed of rotation of roller 109 depends upon the speed of the vessel, stylus 125 describes an equivalent number of vibrations per unit of time, i. e., a greater number at high speed than at low speed, so that merely by counting the number of traced vibration marks described in each time space on strip 123, the speed of the vessel may be ascertained, inasmuch as each vibration represents a definite distance. Likewise, by counting the total number of vibration marks described during a trip, voyage, or the like, the distance travelled may be readily obtained. The divisions of record strip 123 are preferably marked according to the time of day and dated so that the speed of the vessel at any past time may be ascertained merely by examining the record strip 123. A pair of spring-pressed rollers 132 are adapted to constrain the record sheet 125 against the surface of roller 122 so that it will follow the movements of the latter precisely without slippage.

Having described the preferred embodiment of this invention in detail, the operation thereof will be further explained. Assuming that the vessel is accelerating in speed, the increased dynamic fluid pressure in chamber 4 developed by the increasing flow into Pitot tube 2, drives piston 14 downwardly and displaces some of the mercury in cylinder 9 through passage 11 into cylinder 10 to elevate piston 15, inasmuch as the static fluid pressure in chamber 5 remains constant irrespective of the speed of the vessel since tube 3 transmits only the static head to piston 15. Accordingly, the fluid pressure developed is compensated for static pressure and is the true net pressure due to flow. This pressure causes piston 15 to rise and rack 20 travels upwardly along spur wheel 21, thereby rotating the same and causing the displacement of differential bevel gear 26 and accordingly spider 32, which effects the closure of the circuit of electromagnetic clutch 45 to clutch power to shaft 44, which rotates cam 40 to actuate sector 37, gear 36, shaft 35, bevel gears 34 and 33, shaft 28, and differential bevel gear 27 to effect an angular movement of differential spider 32 by an amount equal and opposite to the direction in which it was formerly actuated, which movement breaks the clutch circuit and releases shaft 44 which then becomes stationary. Inasmuch as a constant acceleration of the vessel will effect the constant movement of rack 20, it is evident that the electromagnetic clutch 45 will be intermittently energized and de-energized, whereupon shaft 44 receives a corresponding intermittent rotation. It will thus be seen that the sensitivity of the fluid differential is maintained, inasmuch as the dynamic head developed thereby is not utilized as a driving force but merely as a means of effecting actuating impulses. Since the rotation of shaft 44 represents increments or decrements in the speed of the vessel, the pointers of speedometer 65 and of remote speed indicators 76 are intermittently repositioned at each actuation of shaft 44, and thus the instantaneous actual vessel speed may be indicated at any desirable place about the vessel.

A constant motor speed is maintained by the automatic speed regulator heretofore described, and the thus regulated shaft 82 drives the mechanical integrator disc 106 at constant speed as well as the record drum 122. Integrator driving disc 106 drives balls 111 and roller 109 at a speed depending upon the position at which ball frame 110 is placed by the rotation of speedometer shaft 61 as the latter is driven by shaft 44. Accordingly, odometer 115 is actuated and the distance travelled is designated thereon and by remote distance registers 121 as well. The speed and distance graphic record 123 is made in the manner heretofore described.

The motor is utilized to drive all of the elements of the apparatus, namely, the speed and distance transmitter, the electromagnetic clutch, the integrator and the recorder, so that the apparatus is entirely self-contained and utilizes substantially none of the power developed by the dynamic head due to flow, whereby the sensitivity of the hydraulic differential is unimpaired and thus permits accurate operation and the delivering of true data for the automatic indication of actual instantaneous speeds and distances.

While this specification describes and illustrates a preferred embodiment of this invention, it is to be understood that changes and modifications may be freely made in form and detail without departing from the spirit of the invention, within the scope of the appended claims.

What I claim is:—

1. In apparatus for indicating the speed of a vessel, the combination of a fluid pressure receiver adapted to develop static and dynamic fluid pressures, an element associated therewith actuated by the difference between static and dynamic fluid pressures, a source of power, means for converting fluid pressure into displacements corresponding to a function of said pressure jointly controlled by said receiver and said source of power, and speed indicating means operable with said converting means.

2. In apparatus for indicating the speed of a vessel, a fluid pressure receiver having a submerged portion, hydraulic cylinders in said receiver, pistons in said cylinders, means for transmitting pressure from each of said pistons to the other through liquid interposed therebetween, a motion rectifier controlled by said pistons, and speed indicators connected to said rectifier.

3. In apparatus for indicating the speed of a vessel, a fluid pressure receiver having a plurality of submerged members for applying static and dynamic fluid pressures to the receiver from fluid through which the vessel is adapted to move, means responsive to variable fluid pressure effected by pressures applied by said members and operable to convert the variable fluid pressure in said receiver into uniform motion, means operable with said converting means to generate polyphase variable frequency currents, and means responsive to said currents to indicate the speed of the vessel.

4. In a speed indicating system, the combination of a rigidly mounted hydraulic differential, a variable motion rectifier out of communication with the interior of and controlled by said differential, a motor for driving said rectifier, and speed indicators actuated by said rectifier and said motor.

5. A marine speedometer comprising a hydraulic device in communication with fluid beneath itself and actuated by dynamic fluid pressure, means for rectifying the motion produced by said device, said means being separated from the fluid, a motor for driving said rectifying means, a speed indicator actuated by said rectifying means, and means for transmitting the indicated speed to a distance.

6. In a system for indicating the speed of vessels by hydraulic pressure created by the travel of the vessel, means responsive to the hydraulic pressure, a follow-up power mechanism controlled by said means, a device to maintain the displacements of said mechanism proportional to said speed, calibrated means for indicating the speed of the vessel, and means for transmitting the speed indications to a distance.

7. In a system for indicating the speed of a vessel by fluid pressure, the combination of pressure receiving means having a submerged portion, means for converting the pressure into motion, a power transmitting mechanism actuated by said motion, a cam and follow-up device to control the motion of said mechanism, and speed indicating means responsive to said mechanism.

8. In a system for indicating the speed of a vessel by fluid pressure, the combination of a pressure receiving means having a submerged portion, means including a single member connected with said pressure receiving means for converting the pressure into motion, a follow-up mechanism, means actuated by said converting means for effecting the operation of the follow-up mechanism, means for altering the motion of said follow-up with respect to said converting means, and a device controlled by said follow-up for indicating the speed of the vessel.

9. In a speed indicating system, the combination of a hydraulic differential, a device for determining a function of the pressure in said differential, and actuated by said differential, a power means, connections between said means and said device, a mechanical integrator actuated by said power means in accordance with said function, and connections between said means and said integrator.

10. In a speed indicating system, the combination of a hydraulic pressure device comprising a member responsive to variable pressure, an element mounted independently of said member, a passive medium associated with said member and element, a motion converter responsive to said element and indirectly actuated by said member, a motor, connections between said motor and said converter, a mechanical integrator actuated by said converter, connections between said converter and said integrator, connections between said motor and another portion of said integrator, and indicating means severally actuated by said converter and by said integrator.

11. In apparatus for indicating the speed of vessels, the combination of a fluid pressure receiver, a source of power, rectifying means for mechanically converting the variable fluid pressure into displacements proportional to the speed, said means being controlled by said receiver and driven by said power source, an electrical transmitter operated by said power source and by said rectifier, and remote speed indicators actuated by said transmitter.

12. In apparatus for indicating the speed of vessels, the combination of a fluid pressure receiver, a source of power, rectifying means for mechanically converting the variable fluid pressure into displacements proportional to the speed, said means being controlled by said receiver and out of communication with fluid co-acting with the receiver and also being driven by said power source, an integrator operated by said rectifying means and by said rectifier, electrical transmitters severally actuated by said rectifying means and integrator, and remote indicators operated by said transmitters.

13. In a ship's log, the combination of a fluid pressure receiver, a rectifier for mechanically converting variable fluid pressures into displacements proportional to the speed, a signal transmitter, connections between said rectifier and said transmitter for operating a portion of the latter in accordance with speed, an integrator actuated by said rectifier and operable to measure distance, connections between said integrator and said transmitter for operating a portion of the latter in accordance with distance, and signal receivers operated by said transmitter to indicate the speed and distance in accordance with which the latter is operated.

14. In a ship's log, the combination of a fluid pressure receiver, a rectifier for mechanically converting variable fluid pressures into displacements proportional to the speed, an integrator actuated by said rectifier, a recorder actuated by said integrator, and indicators operated severally by said rectifier and by said integrator, said fluid pressure receiver having internal space for fluid sealed against communication with said rectifier.

15. In a ship's log, the combination of a speed indicator, a distance indicator, a speed and distance recorder, a signal transmitter settable in accordance with speed and distance, means including a motor and driving means for driving said indicators, recorder and transmitter, a speed regulator for said motor, and means for controlling the operation of such driving means.

16. A marine odometer comprising a hydraulic pressure actuated device, a rectifier for mechanically converting the variable fluid pressure into displacements proportional to the speed, means for integrating the rectified motion with respect to time, speed regulating apparatus controlling part of said integrating means, and means for indicating and recording the resultant distance travelled.

17. In apparatus for indicating the speed of vessels, the combination of a fluid pressure receiver, a motor, a rectifying cam, an epicyclic gear train, one member of which is operated by the fluid pressure receiver and another member of which is controlled by means including the rectifying cam, means controlled by a third member of said epicyclic gear train for connecting said rectifying cam with said motor for operation in either direction.

In testimony whereof I affix my signature.
HANNIBAL C. FORD.